United States Patent
Yokoyama et al.

(10) Patent No.: US 9,285,850 B2
(45) Date of Patent: Mar. 15, 2016

(54) INFORMATION PROCESSING APPARATUS THAT VALIDATES ADDED HARDWARE, CONTROL METHOD THEREFOR AND STORAGE MEDIUM

(75) Inventors: Junnosuke Yokoyama, Tokyo (JP); Fumio Mikami, Chigasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 219 days.

(21) Appl. No.: 13/452,036

(22) Filed: Apr. 20, 2012

(65) Prior Publication Data
US 2012/0272048 A1    Oct. 25, 2012

(30) Foreign Application Priority Data
Apr. 20, 2011    (JP) .................................. 2011-094368

(51) Int. Cl.
*G06F 1/00*    (2006.01)
*G06F 1/26*    (2006.01)
*G06F 9/44*    (2006.01)

(52) U.S. Cl.
CPC .............. *G06F 1/263* (2013.01); *G06F 9/4411* (2013.01)

(58) Field of Classification Search
CPC .................................................... G06F 9/4401
USPC .......... 713/300, 100, 323, 340, 1, 2; 707/200; 714/14; 710/302; 399/75; 358/1.14; 709/220
See application file for complete search history.

(56) References Cited

U.S. PATENT DOCUMENTS

| | | | |
|---|---|---|---|
| 6,212,585 B1 * | 4/2001 | Chrabaszcz | H04L 29/06 709/220 |
| 6,263,387 B1 * | 7/2001 | Chrabaszcz | 710/302 |
| 7,058,801 B2 * | 6/2006 | Yakovlev | 713/100 |
| 7,537,163 B2 | 5/2009 | Kikuta | |
| 7,840,840 B2 * | 11/2010 | Takahashi et al. | 714/14 |
| 2005/0038986 A1 * | 2/2005 | Agan | G06F 9/4411 713/2 |
| 2005/0138447 A1 * | 6/2005 | Kobayashi et al. | 713/300 |
| 2006/0294149 A1 * | 12/2006 | Seshadri et al. | 707/200 |

(Continued)

FOREIGN PATENT DOCUMENTS

JP    07281794 A    10/1995
JP    10177434 A    6/1998

(Continued)

OTHER PUBLICATIONS

Chinese Office Action cited in Chinese counterpart application No. CN201210120019.0, dated Oct. 10, 2014. English translation provided.

(Continued)

*Primary Examiner* — Thomas Lee
*Assistant Examiner* — Aurel Prifti
(74) *Attorney, Agent, or Firm* — Rossi, Kimms & McDowell LLP

(57) ABSTRACT

There is provided an information processing apparatus which validates addition of hardware even if the addition takes place before activation of the apparatus, a control method therefor, and a program. To accomplish this, the information processing apparatus includes a monitoring circuit that is supplied with a power from a backup power supply, monitors addition of the hardware, and temporarily holds, when addition of the hardware occurs, information of the addition. If the information of the addition is held, the information processing apparatus initializes the added hardware in activation of the information processing apparatus.

12 Claims, 4 Drawing Sheets

(56) References Cited

U.S. PATENT DOCUMENTS

| | | |
|---|---|---|
| 2007/0260358 A1 | 11/2007 | Katoh |
| 2008/0034195 A1* | 2/2008 | Gilliam ................ G06F 9/4411 713/1 |
| 2009/0119525 A1* | 5/2009 | Morimoto et al. ............ 713/323 |
| 2009/0144573 A1 | 6/2009 | Ohhashi |
| 2009/0157960 A1 | 6/2009 | Koga |
| 2009/0259835 A1* | 10/2009 | Perng .................... G06F 9/4411 713/1 |
| 2010/0115321 A1* | 5/2010 | Fujimoto et al. .............. 713/340 |
| 2010/0134821 A1* | 6/2010 | Wasamoto et al. .......... 358/1.14 |
| 2011/0020025 A1* | 1/2011 | Fujii et al. ...................... 399/75 |
| 2011/0248568 A1* | 10/2011 | Morgan et al. ................... 307/75 |
| 2011/0320842 A1* | 12/2011 | Narushima et al. ........... 713/323 |

FOREIGN PATENT DOCUMENTS

| | | | |
|---|---|---|---|
| JP | 11175206 | A | 7/1999 |
| JP | 11327678 | A | 11/1999 |
| JP | 2001142839 | A | 5/2001 |
| JP | 2004087692 | A | 3/2004 |
| JP | 2007013512 | A | 1/2007 |
| JP | 2007148594 | A | 6/2007 |
| JP | 2007296723 | A | 11/2007 |
| JP | 2009132050 | A | 6/2009 |
| JP | 2009-146061 | A | 7/2009 |
| JP | 2009187205 | A | 8/2009 |

OTHER PUBLICATIONS

Office Action issued in Japanese Patent Application No. 2011094368 dated Feb. 27, 2015.

* cited by examiner

INFORMATION PROCESSING APPARATUS THAT VALIDATES ADDED HARDWARE, CONTROL METHOD THEREFOR AND STORAGE MEDIUM

BACKGROUND OF THE INVENTION

1. Field of the Invention

The present invention relates to an information processing apparatus, a control method therefor, and a storage medium.

2. Description of the Related Art

As a technique of activating an apparatus, there has been conventionally provided a technique of retracting, when the power is turned off, information indicating the state of the apparatus in a storage unit such as an HDD, and restoring, when the power is turned on again, the state of the apparatus by referring to the information stored in the storage unit. In, for example, Japanese Patent Laid-Open No. 2009-146061, when an apparatus decides to use hibernation as an activation method, it retracts contents of a main memory in a USB memory, and then turns off the power. When the power is turned on afterwards, the apparatus expands, on the main memory, the contents of the main memory stored in the USB memory.

As described above, there has been provided, as a technique for activating an apparatus, a retracting technique, when the power is turned off, information indicating the state of the apparatus in a storage unit such as an HDD, and restoring, when the power is turned on again, the state of the apparatus by referring to the information stored in the storage unit.

If, however, option hardware is added while the power is off, and the power is then turned on, the apparatus restores the state of the apparatus without recognizing the hardware. Consequently, even though the hardware has been added, it is not initialized, and is thus not effectively used.

SUMMARY OF THE INVENTION

The present invention enables realization of an information processing apparatus which validates addition of option hardware even if it has been added before activation of the apparatus, and a control method therefor.

One aspect of the present invention provides an information processing apparatus to which hardware is addable, comprising: a first storage unit that stores a state of the information processing apparatus; a control unit that stores the state of the information processing apparatus in the first storage unit when a first power supply supplies a power to the control unit; and a second storage unit that is supplied with a power from a second power supply different from the first power supply when the first power supply stops the power supply to the control unit, and stores information indicating that addition of the hardware has been detected, wherein when a power is supplied by the first power supply to the control unit, the control unit restores the apparatus to the state stored in the first storage unit in a case where the second storage unit does not store the information indicating that addition of the hardware has been detected, and initializes the hardware in a case where the second storage unit stores the information indicating that addition of the hardware has been detected.

Another aspect of the present invention provides an information processing apparatus to which hardware is addable, comprising: a power supply that supplies a power; a backup power supply that supplies a power when the power supply does not supply the power; a storage unit that stores a state of the information processing apparatus; a monitoring circuit that is supplied with a power from the backup power supply, monitors addition of the hardware, and holds, when addition of the hardware occurs, information of the addition; and a control unit that is supplied with a power from the power supply, executes first activation processing of restoring the apparatus to the state stored in the storage unit in a case where the information of the addition is not held, and executes second activation processing of initializing the added hardware in a case where the information of the additional is held, when the information processing apparatus is to be activated.

Still another aspect of the present invention provides a control method for an information processing apparatus to which hardware is addable, comprising: storing, by a control unit that is supplied with a power from a first power supply, when the first power supply supplies a power to the control unit, a state of the information processing apparatus in a first storage unit; monitoring, by a monitoring circuit that is supplied with a power from a second power supply different from the first power supply, when the first power supply does not supply a power to the control unit, addition of the hardware, and storing, when addition of the hardware occurs, information of the addition in a second storage unit; and executing, by the control unit, in a case where the second storage unit does not store the information of the addition, first activation processing of restoring the apparatus to the state stored in the first storage unit, when the information processing apparatus is to be activated; and executing, by the control unit, in a case where the second storage unit stores the information of the addition, second activation processing of initializing the added hardware, when the information processing apparatus is to be activated.

Yet still another aspect of the present invention provides a non-transitory computer-readable storage medium storing a computer program for causing a computer to execute each step of a control method for an information processing apparatus.

Further features of the present invention will be apparent from the following description of exemplary embodiments with reference to the attached drawings.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

<Arrangement of Image Forming Apparatus>

An embodiment of the present invention will be described below with reference to FIGS. 1 to 4. First, the hardware configuration and power supply arrangement of an image forming apparatus according to the embodiment will be explained with reference to FIG. 1. Note that although the image forming apparatus is exemplified as an example of an information processing apparatus to which the present invention is applied, this is not intended to limit the present invention. That is, any information processing apparatus is applicable to the present invention as long as it has the power supply arrangement to be described below.

Figure 1:
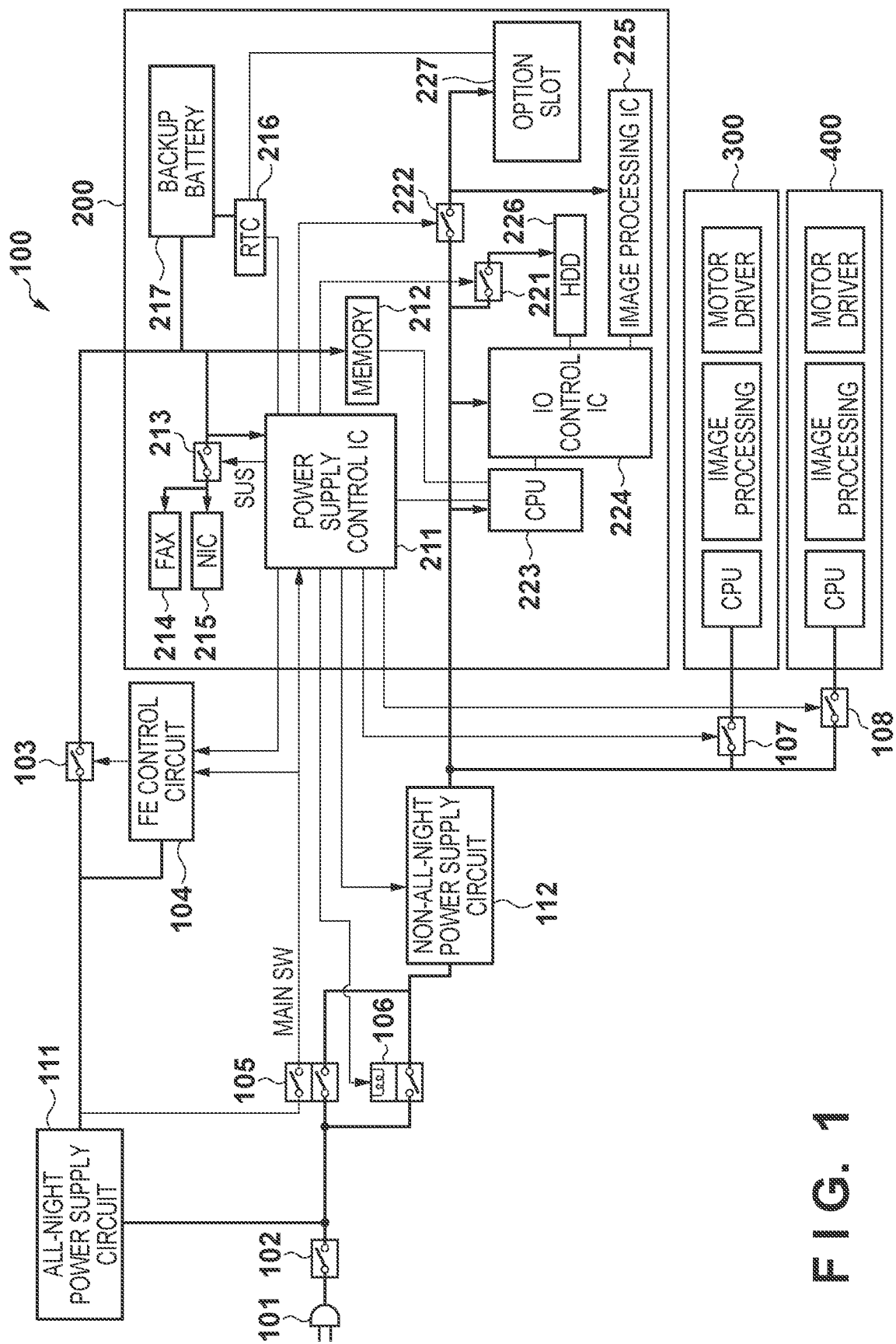
FIG. 1 is a block diagram showing the hardware configuration and power supply arrangement of an image forming apparatus.

An image forming apparatus 100 shown in FIG. 1 is connected with an AC power supply through a power plug 101, and is supplied with a power. A safety switch 102 serves as a switch such as a fuse for preventing a short circuit or electric shock. When the safety switch 102 is off, the image forming apparatus 100 is not supplied with a power. When the safety switch 102 is on, an all-night power supply circuit 111 generates a DC power supply (to be referred to as an all-night power supply hereinafter). The all-night power supply is connected with an FET 103, with which a controller 200 is connected. Note that the all-night power supply indicates a power supply which always supplies a power to a power supply target regardless of an operation mode. A non-all-night power supply (to be described later) indicates a power supply which supplies no power to a power supply target when the apparatus is in a power saving mode (sleep mode).

A main switch 105 is used by a user to perform an off/on operation of the main body, and is arranged at a position where the user can readily operate it. A relay switch 106 is connected in parallel with the main switch 105, and can be turned off by a power supply control IC 211 within the controller 200, which enables the apparatus to automatically reduce power consumption when it is in a sleep mode. A non-all-night power supply circuit 112 can generate a DC power supply (to be referred to as a non-all-night power supply hereinafter) different from the all-night power supply, and its operation can be turned off by the power supply control IC 211. The non-all-night power supply supplies a power to part of a circuit portion within the controller 200, a printer unit 300, and a scanner unit 400, and stops a power supply in a sleep mode.

Although its details are not shown, the printer unit 300 has a circuit portion for executing image processing, a motor driver for driving a motor, and the like. Although its details are not shown, the scanner unit 400 has a circuit portion for executing image processing, a motor driver for driving a motor, and the like. It is possible to separately interrupt the non-all-night power supply to the printer unit 300 and scanner unit 400 by FETs 107 and 108, and to stop a power supply when the image forming apparatus 100 transits to a power saving mode or the like.

The controller 200 is supplied with a power from two systems, that is, the all-night power supply and the non-all-night power supply. It is possible to more finely control the power supplies using FETs 213, 221, and 222. A FAX unit 214 and NIC unit 215 are connected with the all-night power supply. Since these units are supplied with a power even in a sleep mode, it is possible to receive FAX data or packets from a network. A CPU 223, IO control IC 224, image processing IC 225, and HDD 226 are connected with the non-all-night power supply, and operate during execution of a copy, document storage, or print operation. That is, components which need not operate in a sleep mode are basically connected with the non-all-night power supply.

In the image forming apparatus 100, when the main switch 105 is turned on to activate the controller 200, the power supply control IC 211 turns on the relay switch 106. After that, even if the main switch 105 is turned off, the non-all-night power supplies a power via the relay switch 106.

Upon detecting that a signal connected to the main switch 105 has been turned off, the power supply control IC 211 performs the following operation to transit to a quick activation mode. That is, after the CPU 223 cancels jobs and the like in progress, it retracts the state in a memory 212, and notifies the power supply control IC 211 of it. Upon receiving the notification from the CPU 223, the power supply control IC 211 turns off the FET 213 to interrupt a power supply to the FAX unit 214 and NIC unit 215, thereby controlling not to externally receive FAX data or respond to a network. The power supply control IC 211 then transits to a suspend state by turning off the relay switch 106. At this time, instead of the suspend state, the power supply control IC 211 may transit to a hibernation state in which the state until now is held in the HDD 226. The suspend state or hibernation state in which state information immediately before a power supply is stopped is retracted in a non-volatile memory and activation processing is executed, upon subsequent activation, using the state information retracted in the non-volatile memory will be referred to as a quick activation mode hereinafter. Note that the memory 212 or HDD 226 is an example of a first storage unit. On the other hand, a real time clock (RTC) integrated circuit (to be described later) which can be supplied with a power from a backup power supply has a memory corresponding to a second storage unit.

It is possible to disable a quick activation mode by associating the operation of an FEI control circuit 104 with OFF/ON of the main switch 105. In this case, every time the main switch 105 is turned on, it is possible to perform an activation operation from the beginning instead of continuing from a retracted state.

Since a real time clock (RTC) integrated circuit (to be simply referred to as an RTC hereinafter) 216 in FIG. 1 is connected with a backup battery (backup power supply) 217, it can count the time regardless of a power supply of the main body. The RTC 216 includes at least one or more input ports. When an input signal input to a predetermined input port changes, the RTC 216 writes the port and the time (generation information) in an internal non-volatile memory, and generates an interrupt output. It is possible to reset the interrupt output of the RTC 216 by clearing the nonvolatile memory of the RTC 216. When a change in input port occurs, the RTC 216 continues to generate an interrupt output until the non-volatile memory is cleared (initialized) again, even if a change in input port occurs any number of times.

The image forming apparatus 100 according to the embodiment connects, to the input port of the RTC 216, an attachment/removal detection signal (input signal) for a removable board on which an option board expansion slot is arranged, and connects the interrupt output of the RTC 216 to the power supply control IC 211. This makes it possible to store, in the RTC 216, the fact that a board has been added to the option expansion slot even in a power-off state, and to make a determination by only referring to the RTC interrupt output.

<Arrangement of RTC>

Figure 2:
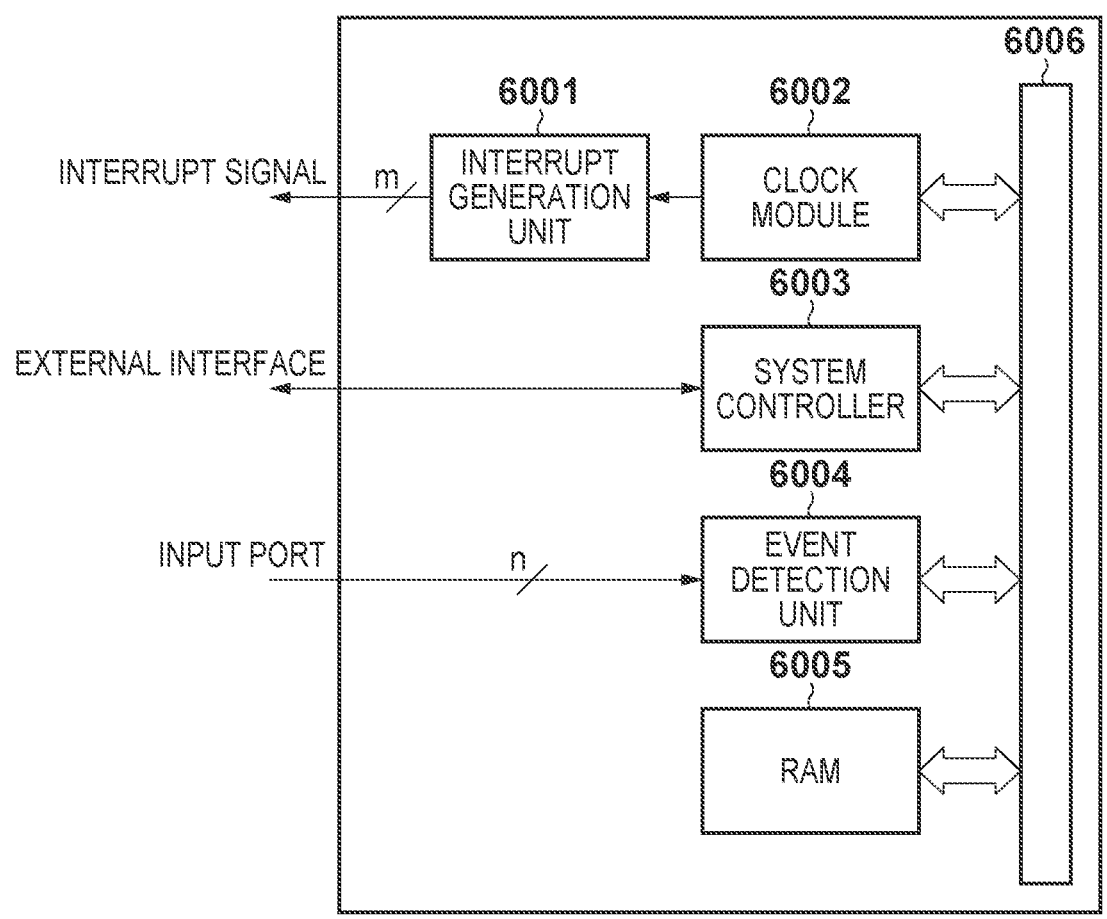
FIG. 2 is a view showing an example of the arrangement of an RTC.

An example of the detailed arrangement of the RTC 216 will be described as an example of a monitoring circuit with reference to FIG. 2. In FIG. 2, reference numeral 6002 denotes a clock module, which instructs an interrupt generation unit 6001 to generate an interrupt output at a set time, and is connected with a system bus 6006 within the RTC 216. Reference numeral 6003 denotes a system controller, which controls each device connected with the system bus 6006 within the RTC 216. The system controller 6003 can receive a timer setting for the clock module 6002 from an external interface terminal or a read/write instruction for a RAM 6005.

Reference numeral 6004 denotes an event detection unit, which detects a change of state in input signal to the input port. That is, the unit 6004 detects that the input signal to the input port has changed from H (high level) to L (low level) or from L (low level) to H (high level). Furthermore, the event detection unit 6004 stores generation information in the RAM 6005 via the system bus 6006 by associating an event occurrence time with identification information of the input port. Note that the RAM 6005 serves as a nonvolatile memory which stores information all the time with, for example, a DC power supplied from a button battery or the like.

<Arrangement of Controller Boards and Controller Box>

Figure 3:
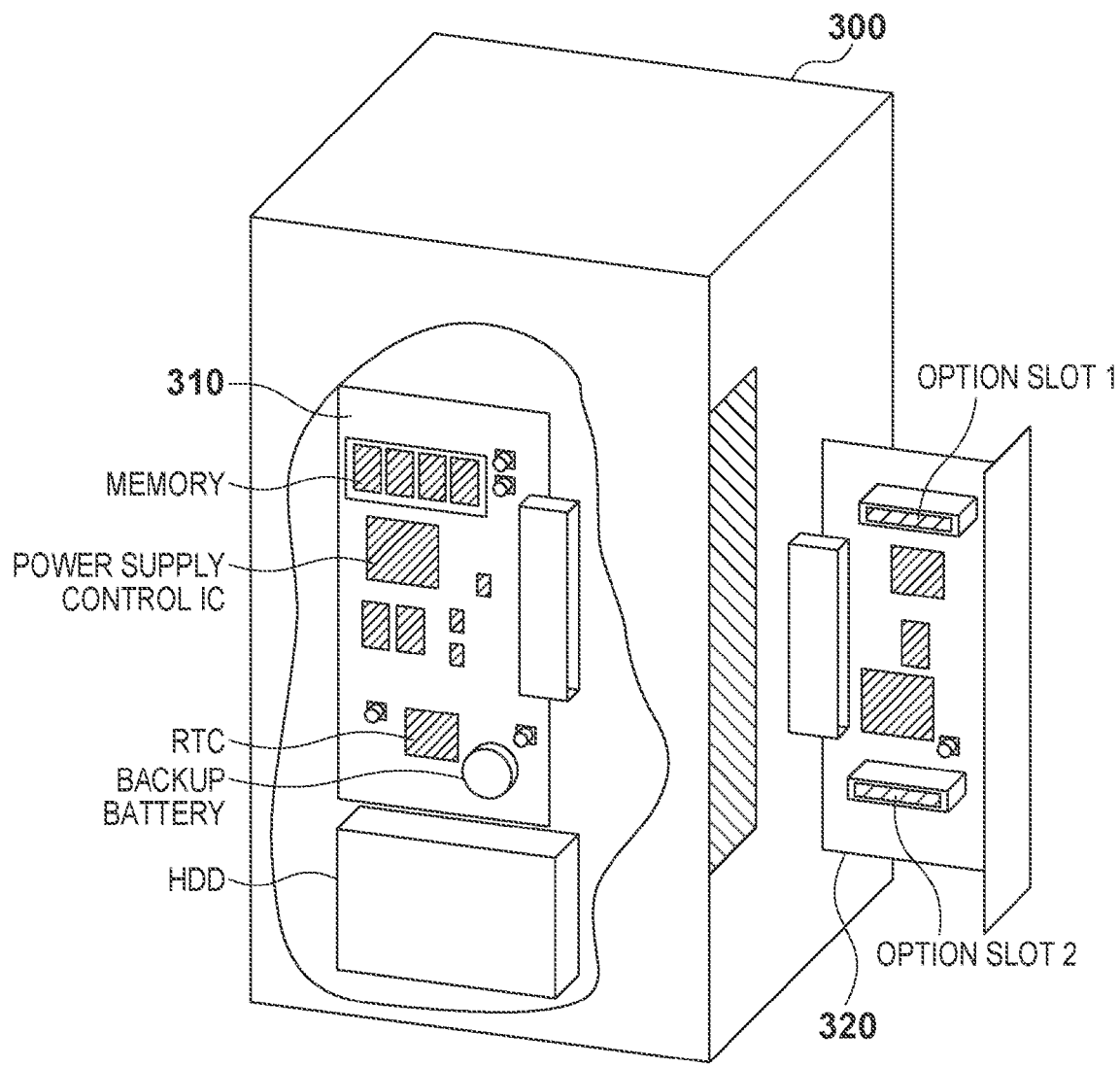
FIG. 3 is a view showing an example of the arrangement of the controller boards and controller box of the image forming apparatus.

An example of the arrangement of controller boards and controller box accommodating the boards of the image forming apparatus 100 will be described with reference to FIG. 3. As shown in FIG. 3, there are at least two controller boards, that is, a fixed board 310 fixed within the main body, and a removable board 320.

In an apparatus which performs the quick activation operation of a suspend state, the memory 212 which holds state information immediately before transiting to the suspend state must be arranged on the fixed board 310, and needs to be always supplied with a power. The removable board 320 includes at least one or more option slots 227 for enabling to add hardware options, and must be taken out from the main body to add an option. The fixed board 310 incorporates at least the RTC 216, backup battery 217, and power supply control IC 211, and detects and stores, with a signal connected to the port of the RTC 216, the fact that the removable board 320 is taken out or put in. That is, the RTC 216 can monitor whether the removable board 320 is taken out or put in, regardless of whether the power supply of the main body supplies a power.

<Processing Procedure>

Figure 4:
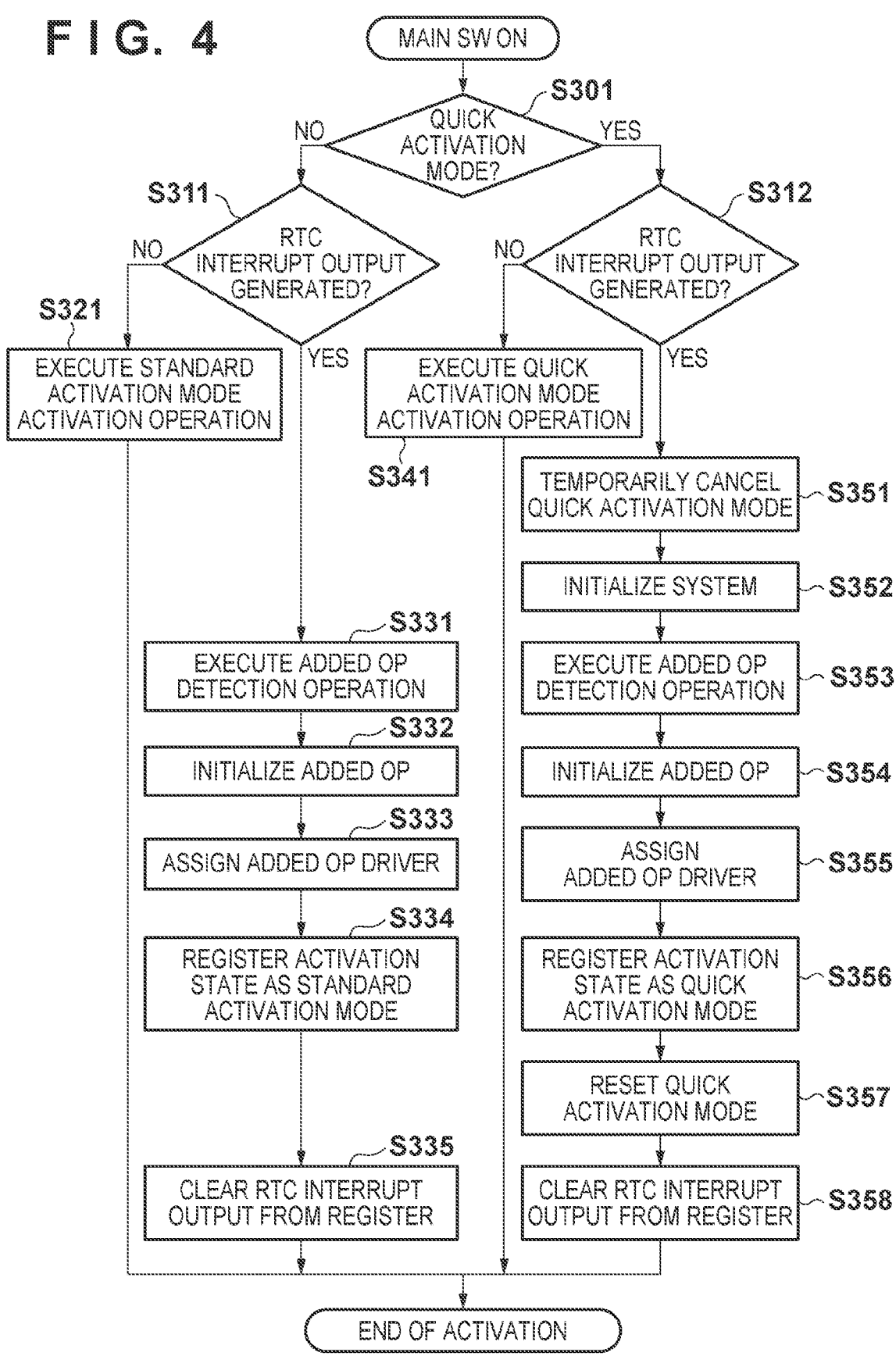
FIG. 4 is a flowchart illustrating an operation upon activation of the image forming apparatus.

Activation processing will be described with reference to FIG. 4. The processing to be explained below is implemented when the CPU 223 executes a control program stored in advance in the HDD 226 or the like. According to the embodiment, the activation processing of the image forming apparatus 100 includes normal activation processing (first activation processing) which is executed when no hardware option is added while the apparatus is inactive, and addition activation processing (second activation processing) which is executed when a hardware option is added. Furthermore, the normal activation processing includes a standard activation mode in which normal activation processing is executed, and a quick activation mode that is simplified as compared with the standard activation mode, in which restoring processing is executed in a suspend state or hibernation state.

In step S301, upon detecting that the main switch 105 has been turned on, the power supply control IC 211 determines, by referring to an internal register value held in itself, whether a quick activation mode is selected in apparatus settings. If the quick activation mode is not selected, the process advances to step S311. The power supply control IC 211 checks generation information (information of the addition) temporarily held in the nonvolatile memory (RAM 6005) of the RTC 216 to determine whether an interrupt output of the RTC 216 has been generated. If an interrupt output has not been generated, the process advances to step S321. The CPU 223 serves as an activation control unit to activate the apparatus in the standard activation mode. The standard activation mode indicates a mode in which the CPU 223 and IO control IC 224 for which the non-all-night power supply has been restored by the power supply control IC 211 execute inquiry processing and initialization processing for a hardware device which existed at the last activation, and processing of loading and installing software.

Alternatively, if it is determined in step S311 that an interrupt output has been generated, the process advances to step S331. The CPU 223 and IO control IC 224 for which the non-all-night power supply has been restored by the power supply control IC 211 serve as an activation control unit to execute addition activation processing. More specifically, in step S331, the CPU 223 and IO control IC 224 execute inquiry processing for detecting an added option. The CPU 223 and IO control IC 224 execute initialization processing corresponding to the added option in step S332, and execute processing of loading and installing a software driver in step S333.

In step S334, the CPU 223 stores registration of boot software as a standard activation mode in the HDD 226 so as to reflect, in a next activation operation, information of the added option and devices existing in this activation operation, and the load and installation of the corresponding software. In step S335, the power supply control IC 211 clears the generation information of the interrupt output from the RAM 6005 of the RTC 216, and terminates the activation operation. The above operation enables to shorten an inquiry time in the activation operation when no hardware option is added.

On the other hand, if the quick activation mode is selected, the power supply control IC 211 determines in step S312 whether an interrupt output has been generated by the RTC 216. If there is no interrupt output, the process advances to step S341. The CPU 223 serves as an activation control unit to reload state information retracted in the memory 212 or HDD 226 and to execute a quick activation mode operation for restoring the apparatus to the previous state.

Alternatively, if an interrupt output has been generated, the process advances to step S351. The CPU 223 serves as an activation control unit to temporarily cancel the quick activation mode, thereby controlling not to reload the state information retracted in the memory 212 or HDD 226. In step S352, the CPU 223 issues an internal reset signal to initialize a system, and then executes addition activation processing. More specifically, in step S353, the CPU 223 and IO control IC 224 execute inquiry processing for detecting an added option. The CPU 223 and IO control IC 224 initialize the detected option in step S354, and load and install a corresponding software driver in step S355.

In step S356, the CPU 223 stores registration of the quick activation mode in the HDD 226 so as to reflect, in a next activation operation, information of the added option and devices existing in this activation operation, and the load and installation of the corresponding software. After that, in step S357, the power supply control IC 211 returns, to a valid state, the quick activation mode setting temporarily cancelled in step S351. In step S358, the power supply control IC 211 clears the generation information of the interrupt output from the RAM 6005 of the RTC 216, and terminates the activation operation.

The above operation enables to shorten an inquiry time in the quick activation operation when no hardware option is added. It is also possible to avoid a state in which the hardware configuration when a hardware option is added is incompatible with the software configuration retracted in the memory 212 or HDD 226, thereby reliably implementing the operation of the added option.

According to the embodiment, therefore, since it is possible to avoid inquiry processing which is conventionally executed even when no hardware option is added, an increase in activation time can be prevented. It is also possible to immediately detect, upon power-on, that a hardware option has been added to the apparatus while its power is off, thereby enabling to shorten an activation time when the option has been added. Furthermore, it is possible to detect that a hardware option has been added to the apparatus which transited to a quick activation mode when the main switch was turned off, and to automatically start an initialization operation, thereby allowing the apparatus to activate in a state in which the option is reliably operable.

The present invention is not limited to the above-described embodiment and various modifications can be made. For example, instead of having option slots on the removable board as shown in FIG. 3 in the above-described embodiment, the input port of the RTC 216 may detect that a cover portion covering an option slot portion is removed (opening and closing of a cover unit). In this case, it is desirable to separately provide a mechanism or sensor for detecting opening and closing of the cover. When the cover unit is opened and closed (strictly speaking, at the timing when the cover unit is removed), the mechanism or sensor changes an input signal to a predetermined input port of the RTC 216. When the input signal changes, the RTC 216 generates an interrupt output, and writes its generation information in the RAM 6005.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-094368, filed on Apr. 20, 2011, which is hereby incorporated by reference herein in its entirety.

What is claimed is:

1. An information processing apparatus to which hardware is addable, comprising:
a first circuit board that is fixed within a main body of the information processing apparatus;
a second circuit board that includes one or more option slots for enabling to add hardware options, and is taken out from the main body when an option is added to the information processing apparatus;
a first storage unit that is arranged on the first circuit board and stores state information which indicates a state of said information processing apparatus;
a control unit that stores the state of said information processing apparatus in said first storage unit while a first power supply supplies a power to said control unit; and
a second storage unit that is supplied with a power from a second power supply different from the first power supply when the first power supply stops the power supply to said control unit, and stores detection information indicating that the second circuit board is taken out from the main body or put in to the main body,
wherein when a power is supplied by said first power supply to said control unit, said control unit restores, by reloading said state information stored in said first storage unit, said apparatus to the state of the information processing apparatus before the power supply to said control unit is stopped in a case where said second storage unit does not store the detection information indicating that the second circuit board is taken out from the main body or put in to the main body, and initializes the hardware in a case where said second storage unit stores the detection information indicating that the second circuit board is taken out from the main body or put in to the main body.

2. The apparatus according to claim 1, wherein the second power supply is a backup battery.

3. The apparatus according to claim 1, further comprising a user operable switch, wherein said information processing apparatus enters an off state by a first actuation of the user operable switch, and the power is supplied by said first power supply to said control unit by a second actuation of the user operable switch.

4. The apparatus according to claim 1, further comprising:
a determination unit that determines, in a case where the second storage unit stores the detection information, a first process as a process which is executed by the control unit when a power is supplied by said first power supply to said control unit, and determine, in a case where the second storage unit does not store the detection information, a second process as a process which is executed by the control unit when a power is supplied by said first power supply to said control unit,
wherein an initializing process of the added hardware is executed in the first process and a restoring process of the state of the information processing apparatus to the state stored in the first storage unit is executed in the first process.

5. An information processing apparatus to which hardware is addable, comprising:
a first circuit board that is fixed within a main body of the information processing apparatus;
a second circuit board that includes one or more option slots for enabling to add hardware options, and is taken out from the main body when an option is added to the information processing apparatus;
a power supply that supplies a power;
a backup power supply that supplies a power when the power supply does not supply the power;
a storage unit that is arranged on the first circuit board and stores state information which indicates a state of said information processing apparatus;
a monitoring circuit that is supplied with a power from said backup power supply, monitors at least one of taking out from the main body and putting in to the main body of the second circuit board, and holds, when the taking out from the main body or the putting in to the main body of the second circuit board occurs while the power supply has stopped the supply of the power, information of addition of the hardware; and
a control unit that is supplied with a power from said power supply, executes first activation processing of restoring said apparatus to the state stored in said storage unit in a case where the information of the addition is not held, and executes second activation processing of initializing the added hardware in a case where the information of the addition is held, when said information processing apparatus is to be activated.

6. The apparatus according to claim 5, wherein
said monitoring circuit includes
a memory,
an interrupt generation unit that monitors an input signal input to a predetermined input port of said monitoring circuit, and generates an interrupt output according to a change in the input signal, and
a write unit that writes the information of the addition in said memory when said interrupt generation unit generates the interrupt output.

7. The apparatus according to claim 6, wherein the input signal changes when the hardware is added to the slot of the second circuit board.

8. The apparatus according to claim 6, further comprising a cover unit that needs to be opened and closed in order to add the hardware,
wherein the input signal changes upon detecting opening or closing of the cover unit.

9. The apparatus according to claim 6, further comprising an initialization unit that initializes said memory after activation of said apparatus.

10. The apparatus according to claim 5, wherein said monitoring circuit includes a real time clock (RTC) integrated circuit.

11. A control method for an information processing apparatus to which hardware is addable, the information processing apparatus comprising a first circuit board that is fixed within a main body of the information processing apparatus, a second circuit board that includes one or more option slots for enabling to add hardware options, and is taken out from the main body when an option is added to the information processing apparatus, a power supply that supplies a power, and a backup power supply that supplies a power when the power supply does not supply the power, the control method comprising:
storing state information which indicates a state of the information processing apparatus in a storage unit being arranged on the first circuit board;
monitoring, by a monitoring circuit that is supplied with a power from said backup power supply, at least one of taking out from the main body, and putting in to the main body of the second circuit board, and holding, when the taking out from the main body or the putting in to the main body of the second circuit board occurs while the power supply has stopped the supply of the power, information of addition of the hardware;
executing, by a control unit that is supplied with a power from said power supply, in a case where the information of the addition is not held, first activation processing of restoring the apparatus to the state stored in the storage unit, when the information processing apparatus is to be activated; and
executing, by the control unit, in a case where the information of the addition is held, second activation processing of initializing the added hardware, when the information processing apparatus is to be activated.

12. A non-transitory computer-readable storage medium storing a computer program for causing a computer to execute a control method for an information processing apparatus to which hardware is addable, the information processing apparatus comprising a first circuit board that is fixed within a main body of the information processing apparatus, a second circuit board that includes one or more option slots for enabling to add hardware options, and is taken out from the main body when an option is added to the information processing apparatus, a power supply that supplies a power, and a backup power supply that supplies a power when the power supply does not supply the power, the control method comprising:
storing state information which indicates a state of the information processing apparatus in a storage unit being arranged on the first circuit board;
monitoring, by a monitoring circuit that is supplied with a power from said backup power supply, at least one of taking out from the main body and putting in to the main body of the second circuit board, and holding, when the taking out from the main body or the putting in to the main body of the second circuit board occurs while the power supply has stopped the supply of the power, information of addition of the hardware;
executing, by a control unit that is supplied with a power from said power supply, in a case where the information of the addition is not held, first activation processing of restoring the apparatus to the state stored in the storage unit, when the information processing apparatus is to be activated; and
executing, by the control unit, in a case where the information of the addition is held, second activation processing of initializing the added hardware, when the information processing apparatus is to be activated.

\* \* \* \* \*